Patented Jan. 10, 1950

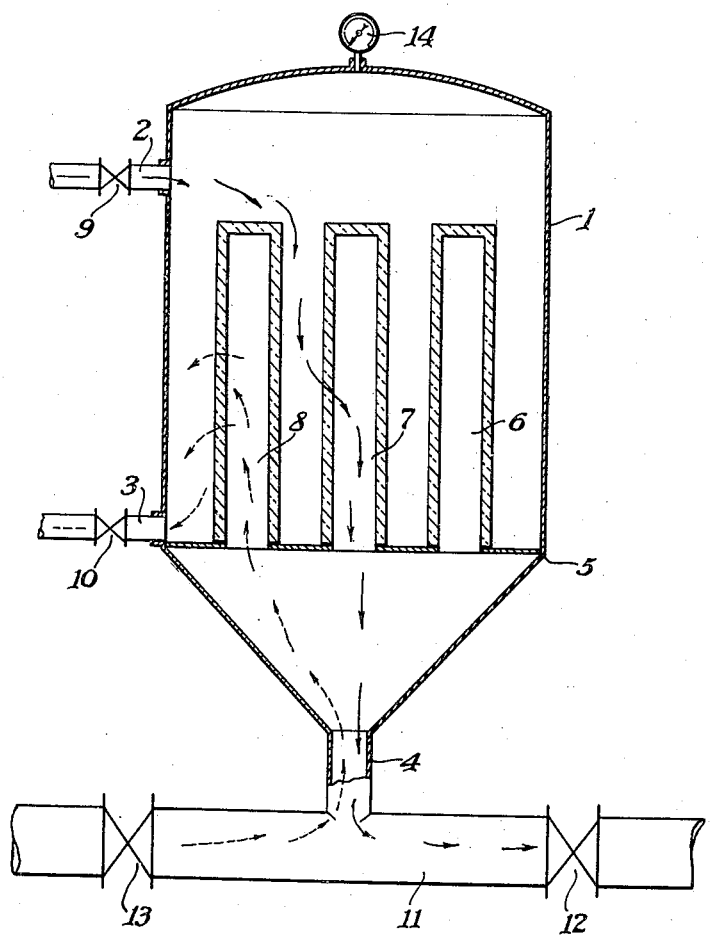

2,494,143

UNITED STATES PATENT OFFICE 2,494,143

METHOD OF PROCESSING VISCOUS SOLUTIONS

Henry G. Reed and John K. Beasley, Kingsport, Tenn., assignors to Eastman Kodak Company, Rochester, N. Y., a corporation of New Jersey Application March 26, 1946, Serial No. 657,221

3 Claims. (Cl. 260—230)

This invention relates to a method of clarifying viscous solutions in which there is employed as the filtering element crystals of an inorganic salt which are insoluble in the solution but which are soluble in water.

The filtering of viscous solutions often involves difficulties, particularly where colloidal or gel particles are present therein. In filtering such solutions ordinarily pressure is employed to force the liquid through the filtering medium. These gel particles have a tendency to clog the pores of the filtering element and, therefore, very poor filtration is obtained. Also, after the filtration is completed, there are often difficulties involved in renewing the filtering element so as to accommodate a fresh supply of solution to be filtered.

One object of our invention is to provide a useful method of filtering viscous solutions having a low water content. Another object of our invention is to provide a filtering method useful for filtering cellulose ester solutions. A further object of our invention is to provide a method of filtering solutions resulting from the preparation of cellulose esters in which the catalyst present is to be neutralized. A still further object of our invention is to provide a filtration method in which renewal of the filtering material is readily accomplished. An additional object of our invention is to provide a filtering method in which clogging of the pores of the filtering material or filter support does not readily occur. Other objects of our invention will appear herein.

Although our invention is directed to the filtering of substantially non-aqueous, viscous solutions generally, it is particularly directed to the filtration of cellulose ester solutions or "dopes" resulting from the esterification of cellulose using a sulfuric acid catalyst. In such a process the final solution obtained, after esterification or after esterification and hydrolysis, consists of a solution of the cellulose ester in lower fatty acid containing a small amount of catalyst and may or may not contain a certain percentage of water, such as up to 25%. It is desirable while the cellulose ester is in this form to remove from the solution any gel particles, fibrous particles, or material in suspension therein. Also, at this time it is desirable to neutralize the catalyst which is present in the solution to stop any action which might otherwise be taking place. We have found that in this case the catalyst may be neutralized with a basic material so as to form an inorganic salt which is insoluble or crystallizes in the fatty acid solution, but which is soluble in water. For example, after a cellulose ester has been formed by esterifying cellulose with a fatty acid anhydride using sulfuric acid as a catalyst and the cellulose ester has been hydrolyzed by adding a small amount of water to the solution and allowing to stand for the desired length of time, the sulfuric acid catalyst may be neutralized with magnesium carbonate, magnesium oxide, magnesium acetate, or the corresponding calcium compounds to form magnesium or calcium sulfate in the solution. The salt thus formed is crystallized due to its poor solubility in the solution and the conditions of treatment, which crystals are formed into a filter bed through which the viscous solution may be readily drawn, thus removing the gel or suspended particles therefrom without any clogging occurring. After the filtration has been completed, the viscous solution adhering to the filter may be removed, if desired, by means of anhydrous acid, such as glacial acetic acid, and the filtering medium may be renewed by flushing with water and for the filtration of the next batch, building up a fresh filter layer. The fitering layer of crystals need be only very thin, such as on the order of $1/32$ of an inch in order to satisfactorily remove suspended materials from the viscous solution which is passed therethrough. This filtering layer is continually being added to and thereby refreshed during filtration by the salt crystals throughout the dope.

If the viscous solution to be filtered does not contain acid catalyst, such as a solution of cellulose acetate in acetone, the solution may be filtered by adding thereto a small amount of crystals, such as magnesium sulfate, and the filtration accomplished in the same manner as with the cellulose ester dope.

Previously for filtration purposes the addition of fibrous material to viscous solutions has been suggested. In the case of cellulose ester dopes this filtration method does not provide for neutralization of the catalyst which in the present invention may be accomplished as a part of the crystal formation. Also, in the case of using fibers, matting may occur when pressure is applied during the filtering operation, and there is some danger of fibrous bits from the fibrous material working loose into the solution being filtered. In the use of inorganic salt crystals, on the other hand, a filter bed is built up which is not compressible and, therefore, retains its porous nature. Also, crystals of large size may be grown if a coarse filtration is desired; while in cases where a finer particle size is desired in the filter bed, finer crystals may be grown or added, thus forming a filter bed having fine pores therein. It is, however, ordinarily desirable that the crystals be of such size that they will not penetrate the stone or other support upon which they are laid down. For instance, if a stone of No. 10 porosity is used it is desirable that the crystals be of a size that they will pass thru a screen of not more than 50 meshes per inch. If a stone of No. 20 porosity is used, crystals of a size that will pass thru a screen of not more than 30 meshes per inch should be used.

In order to form crystals having a size useful for our filtration operation, it is desirable that neutralization of the catalyst occur at an elevated temperature, such as at a temperature of 120 to 160° F. and that the solution then be cooled to some extent so as to form large crystals but still retain an elevated temperature so that the viscosity of the solution is as low as possible while the filtration is occurring. If desired, a few large-size crystals may be added to the solution so as to seed the formation of the type of crystals desired. In general, the greater the quantity of water in the solution in which crystal formation is occurring, the lower the ultimate temperature required for a complete crystallization. As higher temperatures are desirable for filtration because the viscosity of the dope is considerably lower at those temperatures making filtration easier; it is therefore often desirable to add glacial acetic acid to the solution to decrease the water concentration therein. Also, it is desirable that a high concentration of cellulose ester be present so that for a given quantity of cellulose ester a smaller total volume need be filtered. On the other hand, however, too great a concentration of cellulose ester increases the viscosity of the solution, thus cutting down the rate of filtration which is possible.

In its broadest aspects our invention comprises the incorporation in a viscous solution of crystals of an inorganic salt which is insoluble in the solution either by adding the crystals to the solution or by forming the crystals therein such as by neutralizing acid so that crystal formation takes place. This neutralization is preferably accomplished at an elevated temperature, the conditions being so adjusted by cooling or adding of anhydrous acid that complete crystallization of the inorganic salt takes place with the formation of large crystals. The formation of large crystals is enhanced by the rate at which the neutralizing agent, such as magnesium acetate solution in acetic acid is added. The formation of large crystals is also enhanced by positive cooling, either by adding acid of a lower temperature to the mass or by some other means conducive to the formation of large crystals, such as by subjecting to cooling conditions. Vigorous agitation is to be avoided as a rule as this usually makes for the formation of smaller size crystals than are obtained if the mass is only agitated slightly, or preferably, not at all. After crystal formation has occurred in the solution, it is then slowly passed through an element which acts as a support for the filter bed which is formed by means of the crystals. It has been found that porous stones are excellent for this purpose, for example Alundum stones as marketed by the Norton Co. The porosity of the stone should be such that the crystals do not penetrate the pores of the stone. For cellulose ester solutions stones of No. 10 porosity have been found to be most useful.

In order to avoid clogging of the pores of the filter bed support, the viscous solution is pumped slowly at first, and the filtration is started at low pressure, such as about fifteen to thirty pounds per square inch. After a fairly uniform layer of crystals has been formed, the pressure may then be slowly increased, such as over a period of at least two hours to a maximum pressure of 225 pounds per square inch. It is desirable that the starting pressure be maintained at the low point until a layer of about $\frac{1}{32}$ of an inch is built up whereupon the pressure is gradually increased up to the maximum used. By such method of operating, the salt crystals continually being formed on the stone support, form a growing layer of increasing density conducive to the longest filter life before cleaning and starting a new cycle.

The invention may be better described by referring to the accompanying drawing illustrating a filtering apparatus which may be employed in carrying out our invention. The filtering apparatus illustrated consists of a cylindrical chamber 1, with a conical shaped withdrawal section, an inlet 2 near the top of the cylinder, an outlet 3 near the bottom thereof and an outlet 4 at the end of the conical section. In this chamber at the point where the cylindrical portion joins the conical section a base plate 5 is provided as a support for the filter supports 6, 7, and 8, which are composed of porous stone. These elements 6, 7, and 8 may be of any desired shape, such as cylindrical or rectangular, depending on the form in which the stones are available. In the filter apparatus which the applicants have employed these elements have been three feet long and four and one-half inches wide, seven of these elements being present within one cylindrical chamber. The inlet 2 of the chamber is provided with a valve 9 to control the flow of raw dope or acid into the filter chamber. The outlet 3 is provided with a valve 10, which is opened only when the filter is flushed with water. The opening 4 at the bottom of the conical section serves as an outlet for the filtered dope and has an inlet for the flushing water when that operation is being conducted. This aperture 4 connects with pipe 11, provided with a valve 12 to regulate the outflow of the filtered dope and valve 13 to regulate the inflow of the flushing water. The cylindrical chamber is provided at the top with a pressure gauge 14 so as to determine the pressure which is being used to introduce the viscous solution to be filtered. The pressure which is employed for the filtration is critical for the successful operation of the filtration. The filtration operation is carried out by slowly pumping the viscous solution containing the crystals through passage 2 and valve 9, which is open into the chamber 1, having a pressure within the range of 15 to 30 pounds per square inch. Valves 10 and 13 are closed and valve 12 is open. This slow pumping of the solution containing the crystals is continued until an initial low density filter bed of the crystals is built up upon the filtering stone elements 6, 7, and 8, it being advisable that this filtering layer be at least $\frac{1}{32}$ of an inch before starting any appreciable increase in filter pressure. After the filter bed has been built up to the desired thickness, the pressure is built up slowly to the maximum desired using a period of at least two hours.

The filtration operation may be desirably carried out by starting at 5 pounds and increasing the pressure to 25 pounds over a period of 15 minutes or until a thin layer of crystals (at least approximately 1/32 of an inch) is built up. The pressure is then built up at a rate of about 25 pounds per 15 minutes until the maximum pressure to be employed is reached. This may be from 50 p. s. i. up to that beyond which breakdown of the filtration equipment occurs. With the type of equipment described herein a pressure of 250 p. s. i. was about the highest practical pressure but operation is preferably at 225 p. s. i. to allow a margin of safety. With apparatus for filtering having one stone per case, for instance, pressures up to 750 p. s. i. may be employed and satisfactory filtration is obtained. In other types of filtration equipment which are capable of handling heavy pressures, filtrations may be carried out at pressures up to 1000 p. s. i. The maximum filtering pressures which are most desirable for use in accordance with our invention will be found within the range of 50–1000 p. s. i.

After the viscous solution has been run through the filter, or after a point is reached wherein the filtration goes too slowly to be practical, whichever is first, a liquid which will dissolve the viscous solution but will not dissolve the crystals is introduced through passage 2. In the case of a cellulose ester dope glacial acetic acid is ordinarily useful. This acid may then be employed for diluting subsequent dopes or solutions and, therefore, none of the cellulose ester is wasted. This step is a matter of economy and is optional with the individual operator.

After draining off the acetic acid or other solvent which is employed, the valves 9 and 12 are closed and valves 13 and 10 are open. Water, preferably hot, is then introduced into the chamber through valve 13 and the conical section so as to back-wash the filter elements with water. This back-washing dissolves the crystals which are present on the supports, and the resulting water is drawn off through outlet 3. The water may then be removed from the chamber and the stones by rinsing with acetic acid and, if desired, the stones may be cleaned manually, if that appears to be necessary. The filtering apparatus is then ready for a new filtration operation.

The filtration method described herein is particularly useful for filtering the cellulose ester solutions which result from the esterification of cellulose in dope esterification processes such as by reacting upon cellulose with a fatty acid anhydride such as acetic, propionic or butyric anhydride. For example the solutions resulting from esterification or esterification and hydrolysis as described in Blanchard Patent No. 2,304,792, December 15, 1942, or in Malm Patents Nos. 2,345,406, 2,362,575, and 2,362,576 particularly where a sulfuric acid catalyst is employed are eminently suitable for use in the filtration method of our invention.

It is desirable in filtering viscous solutions in accordance with our invention that those solutions be diluted so as to appreciably lower their viscosity. For instance, we have found it desirable in filtering solutions resulting from the esterification of cellulose to add to each part of solution 2–4 parts of diluting liquid. This diluting liquid may be glacial acetic acid or its mixture with other acids such as the spent precipitating acid from a previous batch, remembering that some water content may be tolerated but preferably it should be less than 25% of the mass. The dilution is preferably such that the viscosity of the solution is not more than 5000 cps. viscosity to give a good rate of filtration.

In the addition of neutralizing agent to a cellulose ester dope resulting from the preparation of a cellulose ester, it is desirable that it be added at a temperature above that at which the resulting salt formed is insoluble in the solution. This, for instance, may be 130° F., 140° F., 160° F., or even higher, depending upon the salt which is formed. As a general rule, the higher the temperature at which the neutralizing agent is added, the better will be the crystals for a filtration operation. If, on the other hand, the neutralization occurs at a lower temperature, the crystals which are formed are fine in nature and unless fine crystals are desired, the filtration operation will be somewhat more difficult than where coarse crystals are used. Under such conditions large crystal growth may be enhanced by adding the neutralizing salt or solution slowly over a period of several minutes while agitating the ester dope. Also, it is desirable that the water content of the solution be kept low, such as not more than 25% and preferably not more than 10%. The proportion of crystals which are present should ordinarily be at least .15%, based on the total composition. If the amount of sulfuric acid which is present is so small that it will not supply this proportion of inorganic salt, then it is desirable that additional crystals be added to bring the proportion of inorganic salt up to the desired point. The optimum amount of salt present in any dope to be filtered would depend upon the amount of gel or fiber in that dope. Thus, with relatively clear ester dopes, less salt is required to avoid blanking off the primary stone support or the salt layer being built up.

In flushing out the filtering element with water to remove the crystals from their supports, it is preferable that warm water be employed for this operation. For instance, water having a temperature of 50° C. dissolves the crystals and removes the filtered-out material from the apparatus in much less time than where water of ordinary room temperature is employed. The temperature of the water employed for this operation is not critical. However, the operation is greatly speeded up with water having a substantial temperature to aid in the dissolving action.

The following examples illustrate our invention:

Example I

Cellulose was esterified in an esterification mixture using butyric anhydride and sulfuric acid. To this solution of cellulose acetate butyrate in lower fatty acids was added a small proportion of aqueous acetic acid to convert the anhydride to acid and to supply a small amount of additional water to promote the hydrolysis. Upon dilution the final dope had the following composition:

|   | Per cent |
|---|---|
| Cellulose acetate butyrate | 6.35 |
| Acetic acid | 56.00 |
| Butyric acid | 14.15 |
| Water | 23.42 |
| Sulfuric acid | 0.08 |

The cellulose ester was hydrolyzed by maintaining the temperature at 175° F. in an agitated vessel. At the end of the hydrolysis and while the dope was still at this temperature, the sulfuric acid was completely neutralized with magnesium carbonate dissolved in a small quantity of 75% acetic acid. The dope was then cooled to about 85–95° F. and magnesium sulfate crystals of good size formed during this cooling operation. The solution was then filtered by passing through porous stones in which a crystal layer was built up, and the filtration was accomplished by means of that filter layer.

*Example II*

A cellulose acetate butyrate dope resulting from the esterification of cellulose was dumped from the acetylation vessel. This dope was diluted with 0.2 part of precipitation acid per part of dope. The composition of precipitation acid (acid obtained from previous precipitations) is 32.5% acetic acid, 8.2% butyric acid, and 59.3% water. The diluted dope was subjected to a temperature of 140° F. in an agitated vessel for a sufficient time to impart the desired hydrolysis to the cellulose ester. At the end of the hydrolysis the sulfuric acid is completely neutralized with magnesium carbonate dissolved in a small quantity of 75% acetic acid. This dope had the following composition:

| | Per cent |
|---|---|
| Cellulose acetate butyrate | 16.5 |
| Acetic acid | 37.3 |
| Butyric acid | 30.4 |
| Water | 15.5 |
| Magnesium sulfate | 0.27 |

The dope was diluted with one part of glacial acetic acid and 0.9 parts of precipitation acid per part of dope added at room temperature (about 75–85° F.). The dope was thereby cooled to about 100–105° F. Magnesium sulfate crystals started forming at 140° F. and more crystals formed as the dope was cooled upon the addition of dilute acid. Crystals were formed which were of good size and satisfactory for filtering a viscous dope. The dope was then filtered by slowly passing through porous stones so as to form a thin layer of magnesium sulfate crystals whereupon the pressure was gradually increased so as to run the entire dope through the filter bed of magnesium sulfate crystals. After the filtration the filter bed was flushed with glacial acetic acid and was then back-washed with water having a temperature of 40° C. which removed the magnesium sulfate crystals and suspended materials which had been taken out of the dope.

*Example III*

An esterification dope was diluted, hydrolyzed, and neutralized as in the preceding example. The dope was still further thinned by dilution with 0.67 part of glacial acetic acid per part of mixer dope. This acid was added at 140° F. The crystals may start forming before dilution. Upon the addition of acetic acid the water concentration is lowered and crystal formation is completed at constant temperature. Crystals were formed which were satisfactory for filtration. The dope was filtered at 140° F. as described herein. The dope which was filtered had the following composition:

| | Per cent |
|---|---|
| Cellulose acetate butyrate | 10.7 |
| Acetic acid | 58.5 |
| Butyric acid | 19.6 |
| Water | 10 |
| Magnesium sulfate | 0.17 |

After the solution had been entirely run thru the filter, glacial acetic acid was passed therethru to remove residual cellulose ester solution. The filter was then backwashed with hot water which flushed out suspended materials and dissolved the magnesium sulfate crystals which had formed the filter bed.

We claim:

1. A method of filtering a solution of a lower fatty acid ester of cellulose, resulting from its preparation, which solution contains sulfuric acid and not more than 25% of water, which comprises adding thereto, in the absence of any substantial agitation, only sufficient of a basic magnesium compound to neutralize the sulfuric acid therein which addition is at a temperature of 120–160° F., cooling the solution whereby crystals of magnesium sulfate of at least 50 mesh size are formed, diluting the solution with lower fatty acid to reduce the viscosity thereof to less than 5000 centipoises, then, before the sulfate crystals formed separate from the mass, passing it through porous filter stones at a pressure of 15–30 p. s. i. whereby a thin layer of the sulfate crystals is built up on the stones, which layer serves as a filtering layer, continuing the filtering of the solution through the crystal layer at a pressure gradually increasing up to a safe maximum within the range of 50–1000 p. s. i., upon termination of the filtration passing anhydrous lower fatty acid through the crystal layer, back washing with water to remove the crystal layer, and rinsing with acetic acid to remove the water from the system, followed by passing a fresh supply of lower fatty acid ester of cellulose solution containing magnesium sulfate crystals, in suspension, through the filter stones to build up a new layer of the crystals thereon and filtering the lower fatty acid ester of cellulose solution through the thus-formed crystal layer.

2. A method of filtering a solution of a lower fatty acid ester of cellulose, resulting from its preparation, which solution contains sulfuric acid and not more than 25% of water, which comprises adding thereto, in the absence of any substantial agitation, only sufficient magnesium acetate to neutralize the sulfuric acid therein which addition is at a temperature of 120–160° F., cooling the solution whereby crystals of magnesium sulfate of at least 50 mesh size are formed, diluting the solution with lower fatty acid to reduce the viscosity thereof to less than 5000 centipoises, then, before the sulfate crystals formed separate from the mass, passing it through porous filter stones at a pressure of 15–30 p. s. i. whereby a thin layer of the sulfate crystals is built up on the stones, which layer serves as a filtering layer, continuing the filtering of the solution through the crystal layer at a pressure gradually increasing up to a safe maximum within the range of 50–1000 p. s. i., upon termination of the filtration passing anhydrous lower fatty acid through the crystal layer, back washing with water to remove the crystal layer, and rinsing with acetic acid to remove the water from the system, followed by passing a fresh supply of lower fatty acid ester of cellulose solution containing magnesium sulfate crystals, in suspension, through the filter stones to build up a new layer of the crystals thereon and filtering the lower fatty acid ester of cellulose solution through the thus-formed crystal layer.

3. A method of filtering a solution of a lower fatty acid ester of cellulose, resulting from its preparation, which solution contains sulfuric acid and not more than 25% of water, which comprises adding thereto, in the absence of any substantial agitation, only sufficient magnesium oxide to neutralize the sulfuric acid therein which addition is at a temperature of 120-160° F., cooling the solution whereby crystals of magnesium sulfate of at least 50 mesh size are formed, diluting the solution with lower fatty acid to reduce the viscosity thereof to less than 5000 centipoises, then, before the sulfate crystals formed separate from the mass, passing it through porous filter stones at a pressure of 15-30 p. s. i. whereby a thin layer of the sulfate crystals is built up on the stones, which layer serves as a filtering layer, continuing the filtering of the solution through the crystal layer at a pressure gradually increasing up to a safe maximum within the range of 50-1000 p. s. i., upon termination of the filtration passing anhydrous lower fatty acid through the crystal layer, back washing with water to remove the crystal layer, and rinsing with acetic acid to remove the water from the system, followed by passing a fresh supply of lower fatty acid ester of cellulose solution containing magnesium sulfate crystals, in suspension, through the filter stones to build up a new layer of the crystals thereon and filtering the lower fatty acid ester of cellulose solution through the thus-formed crystal layer.

HENRY G. REED.
JOHN K. BEASLEY.

REFERENCES CITED

The following references are of record in the file of this patent:

UNITED STATES PATENTS

| Number | Name | Date |
| --- | --- | --- |
| 1,860,461 | Hubert | May 31, 1932 |
| 2,259,462 | Fletcher | Oct. 21, 1941 |
| 2,300,180 | Schulze | Oct. 27, 1942 |

OTHER REFERENCES

Elements of Chemical Engineering, by Badger & McCabe, 1936, pages 487-488; McGraw-Hill Book Co., Inc., New York and London.